3,147,226
ANTI-FRITTING LUMINESCENT MATERIALS FOR INTENSIFYING SCREENS
Peter Jönck, Darmstadt, Germany, assignor to
E. Merck AG, Darmstadt, Germany
No Drawing. Filed May 3, 1961, Ser. No. 107,340
Claims priority, application, Germany,
May 5, 1960, M 45,204
14 Claims. (Cl. 252—301.3)

This invention relates to luminescent materials containing an anti-fritting agent, said materials being particularly suitable for the production of intensifying screens which are used to obtain photographs resulting from X-ray or electron photography processes.

The most common luminescent material used for the preparation of X-ray intensifying screens is calcium tungstate. However, the intensifying effect of this latter compound is actually inferior compared to the effect obtained from an alkali iodide activated with thallium. Unfortunately though, in the fabrication of X-ray intensifying screens from thallium-activated alkali iodides, there are several technological problems which result in a rather low and costly rate of production of acceptable screens.

To prepare the thallium-activated luminescent alkali iodides, it is conventional to melt both iodides together so that the thallium is incorporated in the crystal lattice of the alkali iodide after the melt is solidified. The next step is to grind the solidified melt into very fine partcles, which particles are then separated either by screening or air elutriation to obtain a certain range of particle size of the crystals. By virtue of the fact that mechanical grinding is utilized, the surfaces of the resulting crystalline fragments are irregular, thereby increasing the scattering of fluorescent light, and decreasing the sharpness of definition of any intensifying screen made with these crystals. Moreover the crystalline fragments obtained by conventional grinding techniques tend to frit together (cake or agglomerate), whereas in the manufacture of intensifying screens, it is necesary for the luminescent crystals to be flowable and non-cohesive so that they can be uniformly distributed in the film-forming binder. Still another disadvantage of the thallium-activated alkali iodide crystals obtained by finely grinding the iodides is that during a subsequent annealing step, the crystals grow, thereby offsetting the purpose of the particle size separation step. Of these disadvantages, the most troublesome one from the standpoint of producing X-ray intensifying screens, is the tendency of the small particles to frit toegther.

This tendency to frit is also exhibited in other luminescent compositions. For example, fritting is a problem with the halogen phosphates. As a matter of fact, several methods have been proposed to reduce and preferably eliminate the cohesiveness of finely divided luminescent particles. Thus, the prior art teaches that by precipitating a silicic acid coating on a luminescent material, the finely divided particles will not frit together. Unfortunately though, when silicic acid is used in conjunction with a thallium activated alkali iodide material, there results a yellow discoloration which renders the material useless as a luminescent substance for intensifying screens. Furthermore, the crystals frit still together.

The object of this invention, therefore, is to provide a luminescent composition based on thallium activated alkali iodides, which composition is devoid of the disadvantages just previously mentioned. More particularly, it is desired to obtain luminescent, finely divided crystals which are easily flowable, non-fritting, present relatively regular surfaces, and which do not grow during the annealing step.

Another object of this invention is to provide a process for the production of improved luminescent materials.

Upon further study of the specification and appended claims, other objects and advantages of the present invention will become apparent.

In order to obtain the objects of this invention, it is necessary to utilize a quantity of a substantially anhydrous oxide of an element of the third or fourth group of Mendeléeff's periodic system. In brief, this oxide when added to a thallium activated alkali iodide precipitate prior to the separation of the precipitate from its mother liquor, serves as an ant-fritting agent, and furthermore prevents the growth of the iodide crystals during the annealing step.

Of the alkali iodides, it is preferable to employ potassium iodide. It is, however, also feasible to use the other alkali iodides such as sodium iodide, cesium iodide, or rubidium iodide. With respect to the sodium iodide, it should be noted that it is best to protect this salt from humid conditions.

For activating the alkali iodide with thallium, it is preferable to use those thallous compounds which are soluble in water-miscible organic solvents. For example, thallous acetate and thallous hydroxide can be conveniently employed. In general, the ratio in parts by weight of alkali iodide to thallium is about 100 parts of alkali iodide to about 0.01 to 0.5 part thallium, with particularly good results obtained from 0.02–0.4 part thallium. With respect to the anti-fritting oxide that is added to the thallium-activated alkali iodide, it is desirable that this oxide does not deleteriously affect the intensification effect of the luminescent materials. Furthermore the oxide must be substantially colorless, and should be stable at least up to the melting point of the particular alkali iodide which is used. By studying any chemical handbook, it will be possible to select those oxides of the third or fourth group of the periodic system which satisfy the previously recited requisites, and which also are chemically anhydrous. By chemically anhydrous it is meant that there is no water chemically bound with the oxide. In other words only physically attached water can be present. Of the oxides that satisfy all these requirements, the most suitable are alumina, silica, and titanium dioxide, or a mixture thereof.

For particularly excellent sharpness of definition of an intensifying screen, particularly an X-ray intensifying screen, which contains the thallium activated alkali iodide of this invention, it is necessary for the anti-fritting oxide to be present in a very finely divided state of distribution, that is to say the particle size of the oxide should be below about 100 m$\mu$. Particularly excellent results are achieved when using a silicon dioxide having a particle size of about 1–40 m$\mu$. Furthermore, it is advantageous to add the oxide or oxides in a quantity of about 0.05–7% (based on the dry precipitation product). If smaller quantities are used, the desired result is not fully obtained; and conversely if larger quantities are used, the intensification effect of the luminescent materials is deleteriously affected. The best results are obtained when there is employed 0.5–3% of the oxide.

To obtain excellent quality X-ray intensifying screens, it is important to incorporate in said screens a thallium activated alkali iodide having a preferred particle size. Specifically, it is desirable to employ iodides having a particle size of 1–50$\mu$, preferably 2–20$\mu$. To obtain these particle size ranges obviously it is possible to grind and then separate by screening. As mentioned, though, this results in irregular surfaces of the crystalline material which in turn leads to a substantial decrease in the sharpness of definition of an X-ray intensifying screen made with these crystals. Consequently, it is desirable to employ the process of this invention which avoids the steps of particle size reduction and screening by precipitating material in a manner which yields the desired particle size directly.

This precipitation process comprises of mixing an aqueous solution of an alkali iodide having a concentration of at least 50% based on a total weight of the aqueous solution, preferably a saturated solution, with an organic solvent solution of a thallous salt, said organic solvent being miscible with water and being a non-solvent for said alkali iodide. The addition of the thallous salt solution immediately precipitates the alkali iodide and the thallous ion in the form of thallous iodide.

Of the numerous solvents that can be employed in this process, it is preferred to utilize an aliphatic alcohol having 1–4 carbon atoms the most preferable alcohols being ethyl and isopropyl alcohols.

It is also preferred that the aqueous solution of the alkali iodide be heated to a temperature of about 50–100° C. prior to the precipitation, and then to add a cold solution of the thallous salt in the organic solvent to compensate for the heat of the aqueous solution. It is desirable that the final temperature after the two solutions are mixed, is approximately room temperature. The quantity and temperature of the organic solvent solution can be very easily determined by a simple experiment. In some instances, external cooling is recommended. By this type of precipitation, a further growth of the crystals is prevented, and there are obtained crystals having a particle size of about 1–50$\mu$, preferably 2–20$\mu$.

Before, or during, or after the precipitation, it is necessary to incorporate the anti-fritting oxide; in any event, it is preferred to add the oxide prior to the separation of the precipitate from the mother liquor. It is most desirable to add the oxide having a particle size of less than 100 m$\mu$ to the aqueous solution of the alkali iodide and then to mix the aqueous solution with the organic solvent containing the thallous compound thereby precipitating the alkali iodide and the thallous iodide in the presence of the oxide. It is also preferred to conduct the precipitation as rapidly as possible and under vigorous agitation to promote good distribution, and to obtain the desired particle size range of the alkali iodide.

After the precipitate is formed, it should be immediately separated from the mother liquor by centrifuging for example. After the separation step, the precipitate can be washed with the organic solvent and then the product may be either air dried or dried at elevated temperatures. Since the chemically anhydrous oxides adsorb water only at the surface and do not contain chemically bound water, the luminescent materials can be very uniformly dried, whereby the original particle size of the thallium containing alkali iodide crystals is retained. The fact that silicon dioxide is so effective in the present invention was not obvious in view of the fact that silicic acid yellows the alkali iodide and makes it useless. In contrast, by using silicon dioxide, there is obtained a colorless stable, anti-fritting mass of very finely divided crystals. It was highly surprising that silicon dioxide inhibits the oxidation of the alkali iodide thereby yielding a colorless product stable towards oxidation upon storage and in the manufacture of intensifying screens.

After the luminescent crystals are dried, they are then annealed in the usual manner whereby the highest degree of luminescence is obtained. This heat treatment involves heating the luminescent crystals for several hours, for example 2 to 8 hours, at about 600° C. By virtue of this invention, a white, non-fritting, finely divided luminescent mass is obtained which is stable upon storage.

To manufacture intensifying screens with the luminescent material made by this invention, it is necessary to mix the luminescent crystals with a film forming binder. Obviously, this binder can be chosen from a wide variety of materials. In general, it is desirable to utilize as film forming binders the following: polyethylene, polystyrene, polyvinyl chloride or polyvinyl butyral. The ratio of luminescent material to binder is generally in parts by weight about 100 parts luminescent material to 100 to 200 parts binder. The procedure for making the intensifying screen is relatively simple inasmuch as the luminescent material is merely added to the binder while the binder is in the plastic or molten state. Then by careful doctoring, the desired thickness of the screen is obtained. The X-ray intensifying screens made with the luminescent materials of this invention have a high sharpness of definition, and a considerably higher intensifying effect than the usual calcium tungstate screens.

In order to assist the workers in the art, the following non-limitative examples are presented as preferred specific embodiments of this invention. It is to be understood, however, that these examples are not intended to limit the specificiation or appended claims.

EXAMPLE I

To 1 kg. of potassium iodide dissolved in 500 ml. hot water are added about 10 g. of silica having a median particle size of about 12 m$\mu$. To this mixture is added 1.58 g. of thallous acetate in 1.21 isopropyl alcohol at a temperature of −75° C. A fine crystalline, precipitate is obtained. The precipitation step is conducted rapidly and with vigorous stirring while external cooling is applied to the precipitation flask. At the end of this step, the temperature of the ingredients is about 25° C. The precipitate is then separated quickly from the mother liquor by centrifuging, and then washed with isopropyl alcohol. The product is dried either by room temperature air or in a drier at 130° C. Subsequently, the material is heated for 4 hours at 620° C. The resulting product is a white, non-fritting luminescent substance in which the potassium iodide is present in a particle size range of 1–18$\mu$. The intensification factor of this luminescent substance as compared with calcium tungstate, is 7.

EXAMPLE II

To 500 g. of potassium iodide dissolved in 250 ml. of hot water are added 2.5 g. silica having a median particle size of about 12 m$\mu$. To this hot solution, a cold solution at −78° C. is added. This cold solution amounts to 650 ml. of ethyl alcohol containing 0.79 g. thallous acetate. The cold solution and hot solution are vigorously stirred and the reaction is cooled by external cooling means. After the precipitate is separated from the mother liquor and washed with alcohol, the precipitate is dried in air and subsequently annealed for 4 hours at 620° C. A white, non-fritting luminescent substance is obtained having a particle size of 1–18$\mu$ and an intensification factor as compared with calcium tungstate, of 8.

EXAMPLE III

To 500 g. of rubidium iodide dissolved in 225 ml. hot water are added 7 g. silica having a median particle size of about 15 m$\mu$. To this hot solution is added 600 ml. of isopropyl alcohol containing 0.652 g. thallous acetate, said solution having been cooled to −78° C. The precipitation of the alkali iodide immediately takes place, the precipitate is separated, washed, dried, and annealed for 4 hours at 580° C. There is obtained by this example a white, non-fritting powder in which the rubidium iodide is present in a particle size range of 2–20$\mu$. The intensification factor of this luminescent substance as compared with calcium tungstate is 8.

EXAMPLE IV

To 500 g. of potassium iodide dissolved in 240 ml. of water at 100° C. is added 5 g. alumina in a colloidal state. To this hot mixture is added 600 ml. isopropyl alcohol containing 0.7972 g. thallous acetate, the solution having been cooled to −77° C. The thallium-activated alkali iodide, as in the case of the last three examples, is then separated, washed with isopropyl, dried and then annealed for 4 hours at 620° C. From this example there is obtained a white, non-fritting luminescent substance having a particle size below 15μ and an intensification factor as compared with calcium tungstate of 6.

EXAMPLE V

To 500 g. of potassium iodide dissolved in 300 ml. of water are added 5 grams of titanium dioxide having a median particle size of about 30 mμ. This solution warmed to 50° C. is then mixed with 925 ml. of isopropyl alcohol containing 0.890 g. thallous acetate, said solution having a temperature of 20° C. The resulting precipitate is then separated, washed with isopropyl alcohol, dried, and then annealed at 620° C. for 4 hours. The particle size of the white, non-fritting luminescent substance is below 10μ.

In the foregoing examples, any of the alkali iodide that remains in the mother liquor can be recovered by evaporation and recrystallization, and then used once more.

EXAMPLE VI 2 kg. of potassium iodide are dissolved with heating in 1,200 ml. of water. 40 g. of silicon dioxide having an average particle size of about 12 mμ are added. The mixture is cooled to a temperature of about 50° and quickly poured with vigorous stirring into a solution of 3.56 g. of thallous acetate in 3,700 ml. of isopropyl alcohol having a temperature of 18°. The precipitate is filtered off, washed with isopropyl alcohol and dried and then is annealed for 4 hours at a temperature of 620°. The luminescent material thus obtained has a particle size between 1 and 15μ and an intensification factor as compared with calcium tungstate of 7.

EXAMPLE VII

*Preparation of an X-Ray Intensifying Screen*

The luminescent substance prepared in accordance with Example I is processed with a polyethylene having a melting point between 100 and 130° C. 100 grams of this plastic binder are heated to 150° C. in a china dish. Into the resulting melt, there is stirred 100 g. of the luminescent substance through a sieve having a screen aperature of 28μ. Thereby, a uniform mass is obtained which is subsequently poured onto previously heated thin glass plates and doctored and smoothed out with a straight edge of a thicker glass to films having a thickness of about 100 mμ. After cooling, the film is soldified to a screen. By careful reheating the screen surface is smoothed. This fabricated X-ray intensifying screen has a 5-fold intensification factor compared to the commercial calcium tungstate screen.

From the foregoing description, one skilled in the art can readily appreciate the essential characteristics of this invention. Without departing from the spirit and scope of these essential characteristics, it is understood that this invention is susceptible to other modifications in order to adapt it to various usages and conditions, and accordingly such modifications should and are intended to be comprehended within the meaning and range of equivalence of the following claims.

What is claimed is:

1. A luminescent composition consisting essentially of 100 parts by weight of a thallium activated alkali iodide having a particle size from 1 to 50μ and 0.05 to 7 parts by weight of silicon dioxide, said oxide having a particle size of about 1–100 mμ, being stable at least up to the melting point of said alkali iodide, and being added to said composition prior to separating the activated alkali iodide from its mother liquor.

2. The composition of claim 1 wherein the alkali iodide is potassium iodide.

3. A luminescent composition consisting essentially of 100 parts by weight of an alkali iodide activated by 0.02 to 0.4% by weight of thallium, said alkali iodide having a particle size from 1 to 50μ; and about 0.05 to 7 parts by weight of silicon dioxide, said oxide having a particle size of about 1–100 mμ, and being added to said composition prior to separating the activated alkali iodide from its mother liquor.

4. The composition of claim 3 containing 0.5 to 3 parts by weight of the oxide.

5. The composition of claim 3 wherein the oxide has a particle size from 1 to 40 mμ.

6. The composition of claim 3 wherein the alkali iodide has a particle size from 2 to 20μ.

7. The composition of claim 3 wherein the alkali iodide is potassium iodide having a particle size of 2–20μ, and the silicon dioxide has a particle size of 1–40 mμ.

8. An X-ray intensifying screen comprising the composition of claim 3, and a film-forming binder.

9. An X-ray intensifying screen comprising the composition of claim 7, and a film-forming binder.

10. An X-ray intensifying screen comprising the luminescent composition of claim 3 and a film-forming binder selected from the group consisting of polyethylene, polystyrene, polyvinyl chloride and polyvinyl butyral.

11. A process for making non-fritting luminescent materials which process comprises mixing an aqueous solution of an alkali iodide containing at least 50% of the alkali iodide with a thallous compound dissolved in an aliphatic alcohol having 1 to 4 carbon atoms, thereby precipitating thallium activated alkali iodide crystals, and adding, prior to the separation of the crystalline mass from the reaction mixture silicon dioxide, said oxide having a particle size of about 1–100 mμ, and being stable at least up to the melting point of said alkali iodide, the ratio of said oxide to said precipitate being about 0.05–7 parts to 100 parts on a dry weight basis, and annealing the product thus obtained at a temperature of about 600°.

12. The process of claim 11 wherein the oxide is added to the aqueous solution of alkali iodide prior to the precipitation thereof.

13. A process for making non-fritting luminescent materials which comprises mixing an aqueous solution of potassium iodide containing at least 50% of potassium iodide with thallous acetate dissolved in isopropyl alcohol thereby precipitating thallium activated potassium iodide crystals, and adding, prior to the separation of the crystalline mass from the reaction mixture, silicon dioxide having a particle size of about 1–100 mμ, the ratio of the silicon dioxide to the precipitated potassium iodide being about 0.05 to 7 parts on a dry weight basis, and annealing the product thus obtained at a temperature of about 600°.

14. A thallium activated alkali iodide phosphor containing silicon dioxide, the particle size of said phosphor being from 1–50μ, the ratio of the thallium activated alkali iodide to the silicon dioxide, in parts by weight, being 100:0.05 to 7 respectively, and said silicon dioxide having a particle size of about 1–100 mμ, being stable at least up to the melting point of said alkali iodide, and being added to said thallium activated alkali iodide prior to separating the activated alkali iodide from its mother liquor.

References Cited in the file of this patent

UNITED STATES PATENTS

| | | |
|---|---|---|
| 2,537,262 | Ellefson | Jan. 9, 1951 |
| 2,878,137 | Butler et al. | Mar. 17, 1959 |
| 2,968,725 | Ter-Pogossian | Jan. 17, 1961 |

FOREIGN PATENTS

| | | |
|---|---|---|
| 521,099 | Great Britain | May 13, 1940 |